United States Patent
Pagnoni et al.

(10) Patent No.: US 12,524,626 B2
(45) Date of Patent: Jan. 13, 2026

(54) SYSTEMS AND METHODS FOR QUESTION-DRIVEN PRETRAINING FOR CONTROLLABLE SUMMARIZATION

(71) Applicant: Salesforce, Inc., San Francisco, CA (US)

(72) Inventors: Artidoro Pagnoni, Seattle, WA (US); Alexander Fabbri, New York, NY (US); Wojciech Kryscinski, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 357 days.

(21) Appl. No.: 18/299,503

(22) Filed: Apr. 12, 2023

(65) Prior Publication Data

US 2024/0202461 A1    Jun. 20, 2024

Related U.S. Application Data

(60) Provisional application No. 63/387,663, filed on Dec. 15, 2022.

(51) Int. Cl.
*G06F 40/40*  (2020.01)
*G06F 3/0482*  (2013.01)
*G06F 16/34*  (2019.01)

(52) U.S. Cl.
CPC ............ *G06F 40/40* (2020.01); *G06F 16/345* (2019.01)

(58) Field of Classification Search
CPC ....... G06F 40/40; G06F 16/345; G06F 3/0482
See application file for complete search history.

(56) References Cited

FOREIGN PATENT DOCUMENTS

WO    WO-2022015730 A1 *  1/2022 ........... G06F 3/0482

OTHER PUBLICATIONS

Lin, Chun Hung. "Automatic Question Generation with Pre-trained Masked Language Models." (2020). (Year: 2020).*
Kag, Anil, and Venkatesh Saligrama. "Training recurrent neural networks via forward propagation through time." In International Conference on Machine Learning, pp. 5189-5200. PMLR, 2021. (Year: 2021).*
Liu, Sen, Libin Yang, and Xiaoyan Cai. "SEASum: Syntax-enriched abstractive summarization." Expert Systems with Applications 199 (Aug. 2022): 116819. (Year: 2022).*
Kwon, Sunjae, Cheongwoong Kang, Jiyeon Han, and Jaesik Choi. "Why Do Neural Language Models Still Need Commonsense Knowledge to Handle Semantic Variations in Question Answering ?. " arXiv preprint arXiv:2209.00599 (Sep. 1, 2022). (Year: 2022).*

(Continued)

*Primary Examiner* — Paras D Shah
*Assistant Examiner* — Mulugeta Tuji Dugda
(74) *Attorney, Agent, or Firm* — Haynes and Boone, LLP

(57) ABSTRACT

Embodiments described herein provide a task-targeted training paradigm which involves reformulating the pretraining objective to match the downstream task, e.g., query-focused summarization with or without guidance, without additional supervision. Specifically, query-focused summarization is foremost a task in which information is selected and compressed. A training objective is computed based on asking questions about sentences considered to be informative about the text that naturally incorporates a form of guidance of the generation process.

18 Claims, 14 Drawing Sheets

(56) References Cited

OTHER PUBLICATIONS

Sinclair, Neil. "Self-supervised text sentiment transfer with rationale predictions and pretrained transformers." (Feb. 2022). (Year: 2022).*

Chen, Hanjie, et al. "Explaining neural network predictions on sentence pairs via learning word-group masks." arXiv preprint arXiv:2104.04488 (2021). (Year: 2021).*

* cited by examiner

500a

```
┌─────────────────────────────────────────────────────────────────┐
│ Receive, from a communication interface, a training dataset    │
│ containing at least one unlabeled document 501                 │
└─────────────────────────────────────────────────────────────────┘
                              ↓
┌─────────────────────────────────────────────────────────────────┐
│ Select, by a selection model implemented on one or more        │
│ processors, a plurality of sentences from the unlabeled        │
│ document depending on an information overlap metric with a     │
│ rest of the unlabeled document 503                             │
└─────────────────────────────────────────────────────────────────┘
                              ↓
┌─────────────────────────────────────────────────────────────────┐
│ Generate, by a question generation model implemented on the    │
│ one or more processors, a plurality of questions in response   │
│ to an input of the plurality of sentences and the unlabeled    │
│ document as context 505                                        │
└─────────────────────────────────────────────────────────────────┘
                              ↓
┌─────────────────────────────────────────────────────────────────┐
│ Generate a masked document by masking the plurality of         │
│ sentences from the unlabeled document with mask tokens 507     │
└─────────────────────────────────────────────────────────────────┘
                              ↓
┌─────────────────────────────────────────────────────────────────┐
│ Generate, by a summarization model, predicted questions in     │
│ response to an input of the masked document 509                │
└─────────────────────────────────────────────────────────────────┘
                              ↓
┌─────────────────────────────────────────────────────────────────┐
│ Compute a loss comparing the predicted questions and the       │
│ plurality of questions 511                                     │
└─────────────────────────────────────────────────────────────────┘
                              ↓
┌─────────────────────────────────────────────────────────────────┐
│ Train the summarization model by updating parameters of the    │
│ summarization model based on the computed loss via             │
│ backpropagation 715                                            │
└─────────────────────────────────────────────────────────────────┘
```

```
┌─────────────────────────────────────────────────────────────┐
│ Receive, from a communication interface, a training dataset │
│ containing at least one unlabeled document 501              │
└─────────────────────────────────────────────────────────────┘
                              ↓
┌─────────────────────────────────────────────────────────────┐
│ Select, by a selection model implemented on one or more     │
│ processors, a plurality of sentences from the unlabeled     │
│ document depending on an information overlap metric with a  │
│ rest of the unlabeled document 503                          │
└─────────────────────────────────────────────────────────────┘
                              ↓
┌─────────────────────────────────────────────────────────────┐
│ Generate, by a question generation model implemented on the │
│ one or more processors, a plurality of questions in response│
│ to an input of the plurality of sentences and the unlabeled │
│ document as context 505                                     │
└─────────────────────────────────────────────────────────────┘
                              ↓
┌─────────────────────────────────────────────────────────────┐
│ Generate a masked document by masking the plurality of      │
│ sentences from the unlabeled document with mask tokens 507  │
└─────────────────────────────────────────────────────────────┘
                              ↓
┌─────────────────────────────────────────────────────────────┐
│ Generate, by the summarization model, a predicted summary   │
│ containing one or more sentences in response to an input of │
│ the masked document prepended with the plurality of         │
│ questions 519                                               │
└─────────────────────────────────────────────────────────────┘
                              ↓
┌─────────────────────────────────────────────────────────────┐
│ Compute a loss comparing the predicted one or more sentences│
│ and the plurality of sentences 521                          │
└─────────────────────────────────────────────────────────────┘
                              ↓
┌─────────────────────────────────────────────────────────────┐
│ Train the summarization model by updating parameters of the │
│ summarization model based on the computed loss via          │
│ backpropagation 523                                         │
└─────────────────────────────────────────────────────────────┘
```

FIG. 5B

| Model | Rouge1 | Rouge2 | RougeL | BS-R |
|---|---|---|---|---|
| QMSum | | | | |
| BART-LS | 37.90 | 12.10 | 33.10 | - |
| BART-Large SegEnc | 37.05 | 13.04 | 32.62 | 87.44 |
| *+ WikiSum Pre-Finetuning* | *37.80* | *13.43* | *33.38* | *-* |
| + BART Pret. 1M | 36.64 | 12.44 | 31.94 | 86.94 |
| + SOCRATIC Pret. 1M | 37.46 | 13.32 | 32.79 | 87.54 |
| + PEGASUS Pret. | 37.29 | 13.30 | 32.70 | 87.48 |
| + SOCRATIC Pret. | 38.06 | 13.74 | 33.51 | 87.63 |
| Squality | | | | |
| LED | 27.7 | 5.9 | 17.7 | - |
| PEGASUS | 38.2 | 9.0 | 20.2 | - |
| BART | 40.2 | 10.4 | 20.8 | - |
| BART + DPR | 41.5 | 11.4 | 21.0 | - |
| Human | 46.6 | 12.5 | 22.7 | - |
| BART-Large SegEnc | 45.68 | 14.51 | 22.47 | 85.86 |
| + PEGASUS Pret. | 45.78 | 14.43 | 22.90 | 85.94 |
| + SOCRATIC Pret. | 46.31 | 14.80 | 22.76 | 86.04 |

FIG. 9

Original Text: In a group discussion about a philosophical concept, Sarah used the Socratic method by asking and answering questions to stimulate critical thinking and clarify underlying assumptions. The method helped her and her classmates achieve a deeper understanding of the concept and address disagreements. Sarah looked forward to continuing to use it in her studies.

Content Questions (Ours): How did Sarah use the Socratic method? What were the benefits of the Socratic method? What did Sarah think of the method?

Keywords: Group discussion | Sarah | Socratic method | questions | thinking | assumptions || method | classmates | understanding | disagreement || studies

Blueprint QA: What type of discussion did Sarah have about a philosophical concept? Group discussion | Who used the Socratic method? Sarah | What method did Sarah use to stimulate critical thinking? Socratic method | What did Sarah ask in the Socratic method? questions | What did Sarah clarify in the Socratic method? assumptions ...

FIG. 12

| Control Strategy | Model | Summary | | | | Control Plan | | | |
|---|---|---|---|---|---|---|---|---|---|
| | | Rouge1 | Rouge2 | RougeL | BS-R | Rouge1 | Rouge2 | RougeL | Leven. Edit |
| Content Questions | BART-Large SegEnc | 35.3 | 11.6 | 30.7 | 86.95 | 42.3 | 23.4 | 41.6 | 0.77 |
| | +PEGASUS Pret. | 35.4 | 11.8 | 30.9 | 87.03 | 41.7 | 22.9 | 41.0 | 0.74 |
| | +SOCRATIC Pret. | 36.0 | 12.1 | 31.5 | 87.15 | 42.4 | 23.2 | 41.7 | 0.77 |
| Blueprint QA | BART-Large SegEnc | 33.5 | 9.3 | 29.4 | 86.62 | 40.2 | 15.7 | 39.2 | 0.85 |
| | +SOCRATIC Pret. | 35.4 | 10.0 | 30.6 | 86.89 | 40.7 | 15.9 | 39.6 | 0.85 |
| Keywords | BART-Large SegEnc | 36.2 | 12.8 | 31.4 | 87.01 | 24.1 | 9.2 | 21.3 | 0.88 |
| | +SOCRATIC Pret. | 36.9 | 13.2 | 32.1 | 87.01 | 25.0 | 10.0 | 22.1 | 0.88 |

FIG. 13

| Oracle Strategy | Model | R-1 | R-2 | R-L | BS-R |
|---|---|---|---|---|---|
| Content Questions | BART-Large SegEnc | 43.7 | 18.0 | 39.0 | 88.32 |
| | + SOCRATIC Pret. | 46.8 | 20.3 | 41.7 | 88.92 |
| Blueprint QA | BART-Large SegEnc | 52.9 | 24.1 | 46.8 | 89.63 |
| | + SOCRATIC Pret. | 56.3 | 26.6 | 49.3 | 90.03 |
| Keywords | BART-Large SegEnc | 45.7 | 20.2 | 40.5 | 88.73 |
| | + SOCRATIC Pret. | 47.5 | 21.9 | 42.5 | 89.18 |

SYSTEMS AND METHODS FOR QUESTION-DRIVEN PRETRAINING FOR CONTROLLABLE SUMMARIZATION

CROSS REFERENCES

The instant application is a nonprovisional of and claims priority under 25 U.S.C. 119 to commonly-owned and U.S. provisional application No. 63/387,663, filed Dec. 15, 2022, which is hereby expressly incorporated by reference herein in its entirety.

TECHNICAL FIELD

The embodiments relate generally to natural language processing and machine learning systems, and more specifically to systems and methods for question-driven pretraining for controllable summarization.

BACKGROUND

Machine learning systems have been widely used in natural language processing (NLP) tasks, such as question answering, intent classification, document summarization, and/or the like. For example, traditionally, a language model can be pretrained and then fine-tuned on task-specific data such as documents and corresponding reference summaries, to perform summarization of a document. However, labeled data in summarization training can often be scarce. Current datasets available for training are mostly result of expensive annotation efforts and only include hundreds to a few thousand question document pairs with often the same document being repeated. This leaves NLP models to learn both the content selection and synthesis for summarization with only a few examples.

Therefore, there is a need for more efficient training of summarization models.

BRIEF DESCRIPTION OF THE DRAWINGS

FIGS. 5A-5C are an example logic flow diagrams illustrating different modes of pretraining a question-driven summarization model based on the framework shown in FIG. 4, according to some embodiments described herein.

FIGS. 6-15 provide example data experiment performance of the summarization model pretrained using embodiments described in FIGS. 1B-5C.

Figure 1A:
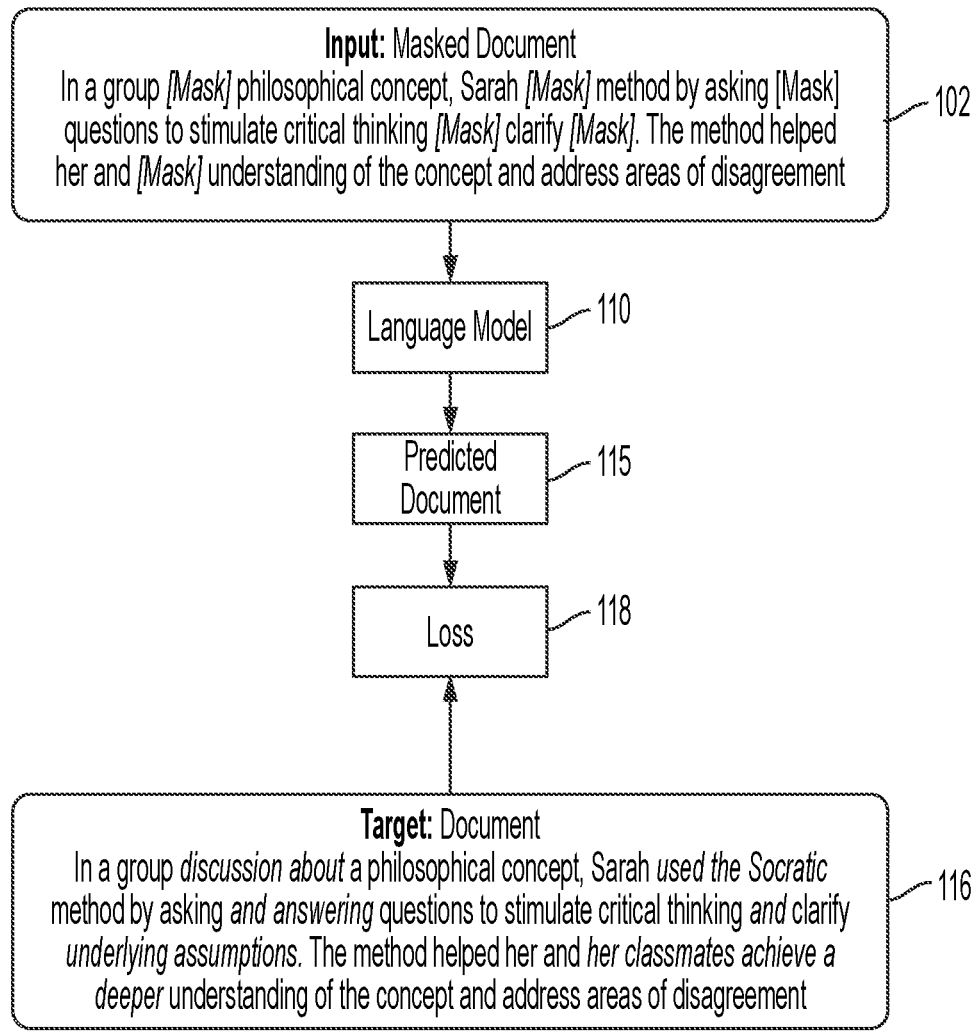
FIG. 1A is a simplified diagram illustrating denoising pretraining for a language model to reconstruct masked words and/or sentences from an input document, according to the prior art.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Summarization models are a type of NLP models that have been fine-tuned to perform summarization tasks, e.g., to generate a summary of an input document. The summarization task may include query-focused summarization and guided summarization. For example, in practical settings, human users often want to know specific information about a document and a generic summary could be insufficient to satisfy their needs. This is particularly evident when dealing with long documents such as books or meeting transcripts. Thus, query-based summarization focuses on answering questions by summarizing the relevant information in a document. Another variant, guided summarization may be adopted to understand and control the summary generation. Specifically, the model is tasked to predict both a plan of the summary and then summary itself with the idea that a human could interact with the plan and alter the generation.

However, labeled data in summarization training can often be scarce. Current datasets available for training are mostly result of expensive annotation efforts and only include hundreds to a few thousand question document pairs with often the same document being repeated. This leaves NLP models to learn both the content selection and synthesis for summarization with only a few examples. Therefore, in controllable summarization, summaries are grounded by queries, so there is a need for a pretraining framework in unlabeled data in a scalable manner.

In view of the need for improved summarization training, embodiments described herein provide an unsupervised pretraining framework for language models on controllable summarization. Specifically, the pretraining method facilitates the identification of relevant content from the input document and ensures that the generated summary faithfully responds to a user query. During pretraining, the language model is trained to generate relevant questions based on the input document and then generate an answer to each of the relevant questions, bringing fine-grained controllability to model pretraining which translates to better adherence to user queries.

In one embodiment, the pretraining framework comprises a selection model, a question generation model and the target language model. The selection model is configured to select sentences from an unlabeled document as a pseudo-summary. The question generation model is configured to generate respective questions corresponding to each selected sentence conditioned on the document. The generated questions, the pseudo summary are then used to pretrain the target model in generating a summary corresponding to user queries.

Therefore, in this way, by training the language model to generate and answer relevant questions in a given context, the pretraining enables the language model to effectively adhere to user-provided queries and identify relevant content to be summarized. Thus, accuracy of question-driven summarization is improved by the pretrained language model. The pretrained language model may provide reading interfaces on a user device that generates user query-based summarization of long documents, which largely improves user reading experience.

FIG. 1A is a simplified diagram illustrating denoising pretraining for a language model to reconstruct masked words and/or sentences from an input document, according to the prior art. Traditionally, a language model may be trained to reconstruct masked words and/or sentences from an input document such that the language model may be used to "denoise" an input document. Specifically, an input masked document 102, which has one or more words, phrases and/or sentences be replaced by the [MASK] token, may be input to the language model 110. The language model 110 may generate a predicted document 115 including predicted words, phrases and/or sentences corresponding to the [MASK] tokens. The predicted document 115 may be compared with the ground-truth target document, e.g., the original unmasked document 116 to compute a loss 118, e.g., the binary cross entropy of the output distribution from the language model 110. The language model 110 may then be updated based on the loss 118 via backpropagation.

Figure 1B:
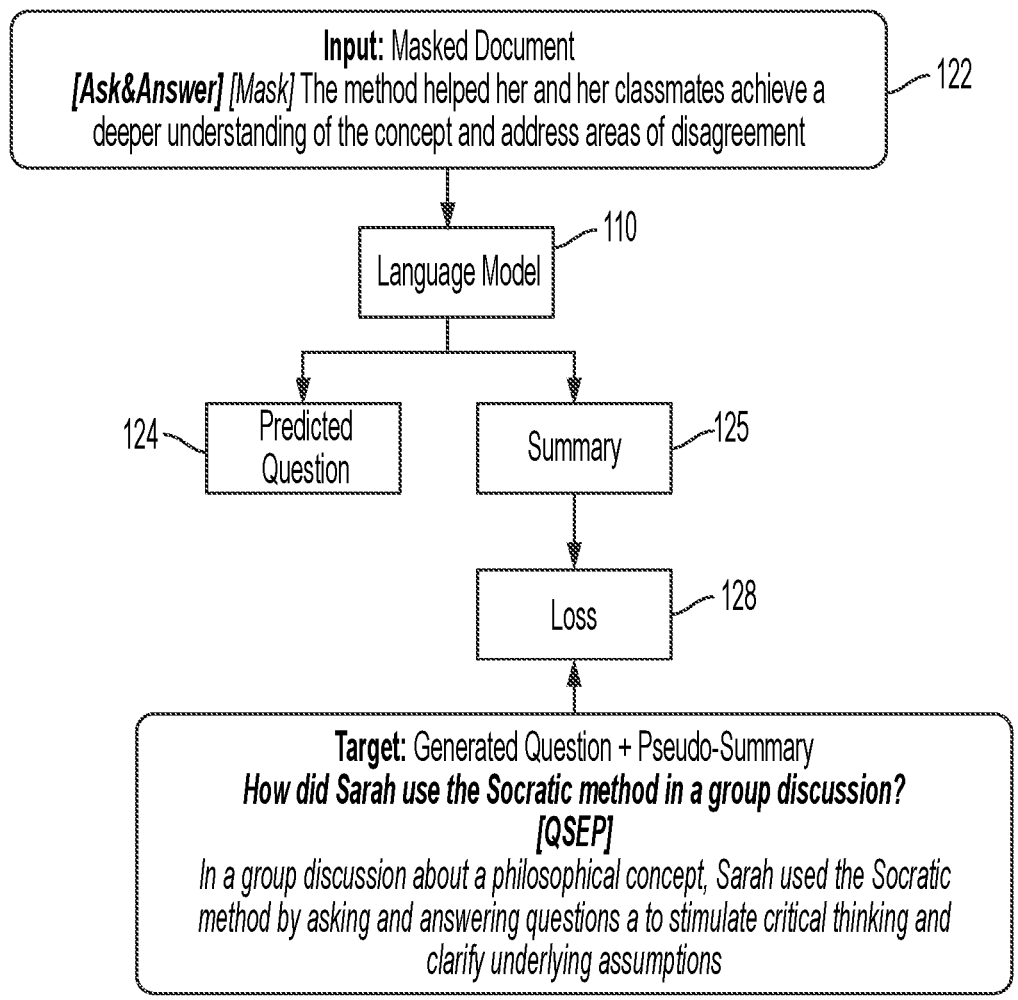
FIG. 1B is a simplified diagram illustrating the pretraining framework for a language model on user query-based summarization, according to embodiments described herein.

FIG. 1B is a simplified diagram illustrating the pretraining framework for a language model on user query-based summarization, according to embodiments described herein. During pretraining, the language model 110 takes as input the masked document 122 with important sentences masked and is trained to generate predicted questions 124 about the masked content and to produce the masked content (e.g., the sentences form a summary 125 of the document) itself.

As seen in FIG. 1B, the pretraining is formulated as a sequence-to-sequence task. First, important content is selected from unlabeled documents to be masked. Then, a question-generation model is applied to produce questions about the selected content. The question generation model trains the language model 110 to produce summaries 125 grounded to questions 124. The generated predicted questions 124 are then compared with the generated questions from the question-veneration model, and the predicted summary 125 is compared with the collection of important content from the input document to compare a loss 128, e.g., the binary cross entropy of the output distribution from the language model 110.

In this way, the language model 110 allows for controllability as the end-user can prompt the language model 110 decoder with new questions during inference.

Figure 2:
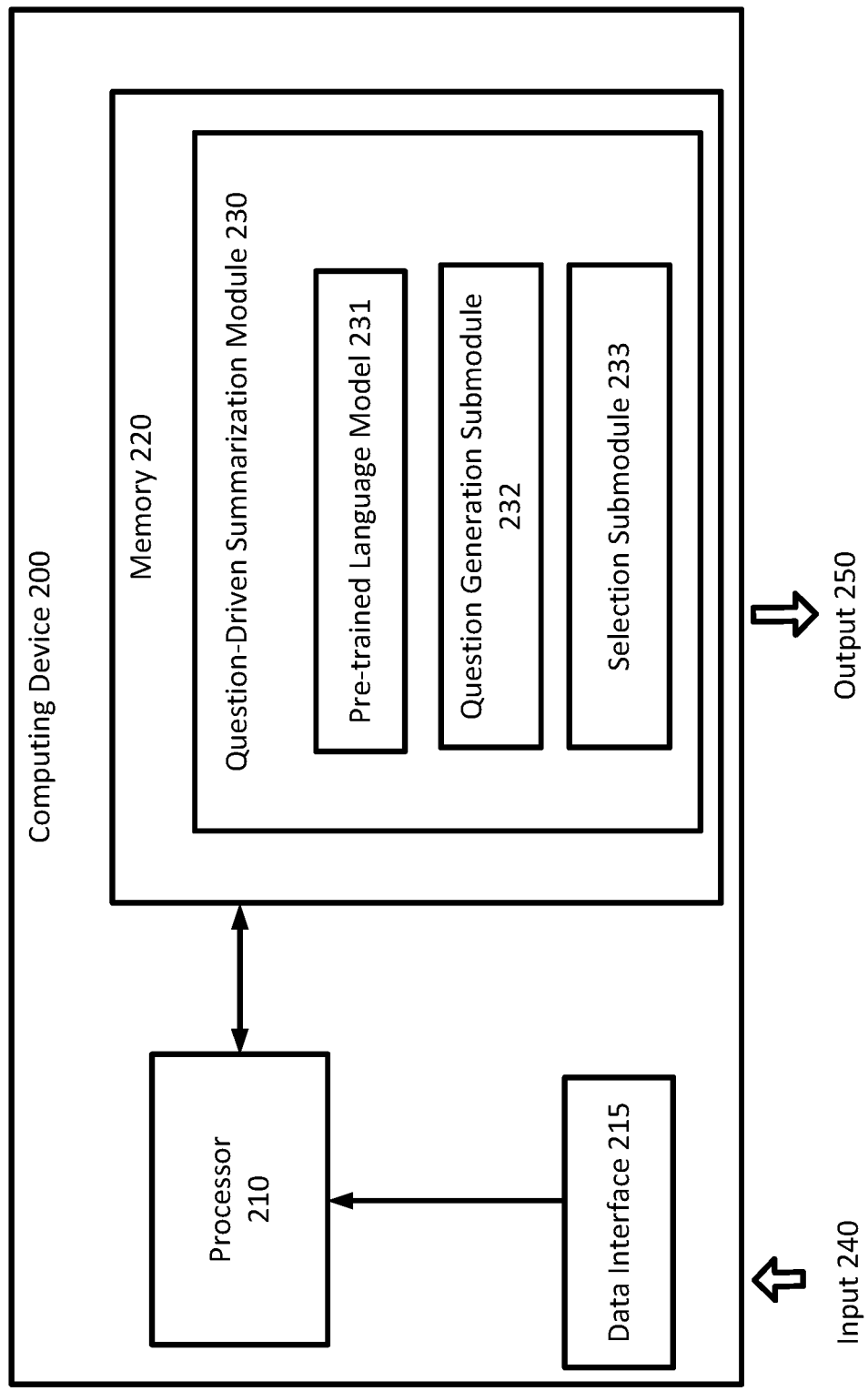
FIG. 2 is a simplified diagram illustrating a computing device implementing the question-driven training described in FIGS. 1-2, according to one embodiment described herein.

FIG. 2 is a simplified diagram illustrating a computing device implementing the question-driven training described in FIGS. 1-2, according to one embodiment described herein. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for question-driven summarization module 230 that may be used to implement and/or emulate the systems and models, and/or to implement any of the methods described further herein. The question-driven summarization module 230 may receive input 240 such as an input training data (e.g., documents, etc.) via the data interface 215 and generate an output 250 which may be generated questions and question-based summaries.

The data interface 215 may comprise a communication interface, a user interface (such as a voice input interface, a graphical user interface, and/or the like). For example, the computing device 200 may receive the input 240 (such as a training dataset of unlabeled documents) from a networked database via a communication interface. Or the computing device 200 may receive the input 240 from a user via the user interface, e.g., by a user uploading a document In some embodiments, the question-driven summarization module 230 is configured to generate a summary of an input document according to a user query, e.g., the summary aims at answering the user query based on the content of the input document. The question-driven summarization module 230 may further include a pre-trained language model submodule 231, a question generation submodule 232 and a selection submodule.

The selection submodule 233 may select important content from unlabeled documents to be masked. For example, the selection submodule 233 may adopt using the PEGASUS-style Gap Sentence Generation (GSG) objective (Zhang et al., PEGASUS: pre-training with extracted gap-sentences for abstractive summarization, in Proceedings of the 37th International Conference on Machine Learning, volume 119 of Proceedings of Machine Learning Research, pages 11328-11339, 2020). Specifically, sentences with the highest self-Rouge scores with the document are selected for masking, ensuring that the selected sentences have high information overlap with the rest of the document. The selected sentences are then concatenated to produce a pseudo-summary of the document. For example, the selection submodule 233 may adopt a Gap Sentence Ratio (GSR) of 45%, meaning that 45% of the sentences in the document are selected to appear in the target pseudo-summary. To help the language model submodule 231 to learn to copy, 80% of these sentences are masked and 20% are kept unmasked in the input document. Documents and summaries are truncated to 512 and 256 tokens.

The question generation submodule 232 may generate a question from each sentence of the pseudo-summary. Specifically, the question generation submodule 232 takes as input one of the selected sentences at a time and the unmasked document context. For example, the question generation submodule 232 may adopt the MixQG model (Murakhovs'ka et al., MixQG: Neural question generation with mixed answer types, in Findings of the Association for Computational Linguistics: NAACL 2022, pages 1486-1497, 2022).

In this way, training questions are generated for each selected sentence, as opposed to each entity or the entire summary. First, sentences in the pseudo-summary are selected from across the document and generally lack coherence, so there is no single query they collectively answer. Second, existing question generation models are not trained to produce paragraph-level questions. Third, entity-level questions are often simple paraphrases of the answer sentence and are uncommon in datasets. Questions whose answers are full sentences, therefore, offer a compromise in terms of the complexity of the question and the coherence of the answer. Thus, these sentence-level questions are used as content-questions as they tend to ask about the content of the document instead of specific entities.

Then, the language submodule 231 may be pretrained using the questions generated by the question generation model 232 and the pseudo summary generated by the selection submodule 233. Details of the pretraining objectives may be discussed in relation to FIG. 4.

In one embodiment, the question-driven summarization module 230 and one or more of its submodules 231-233 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 220 as a structure of layers of neurons, and parameters describing the non-linear transformation at each neuron and the weights associated with edges connecting the neurons. An example neural network may be a Transformer network, and/or the like.

Figure 4:
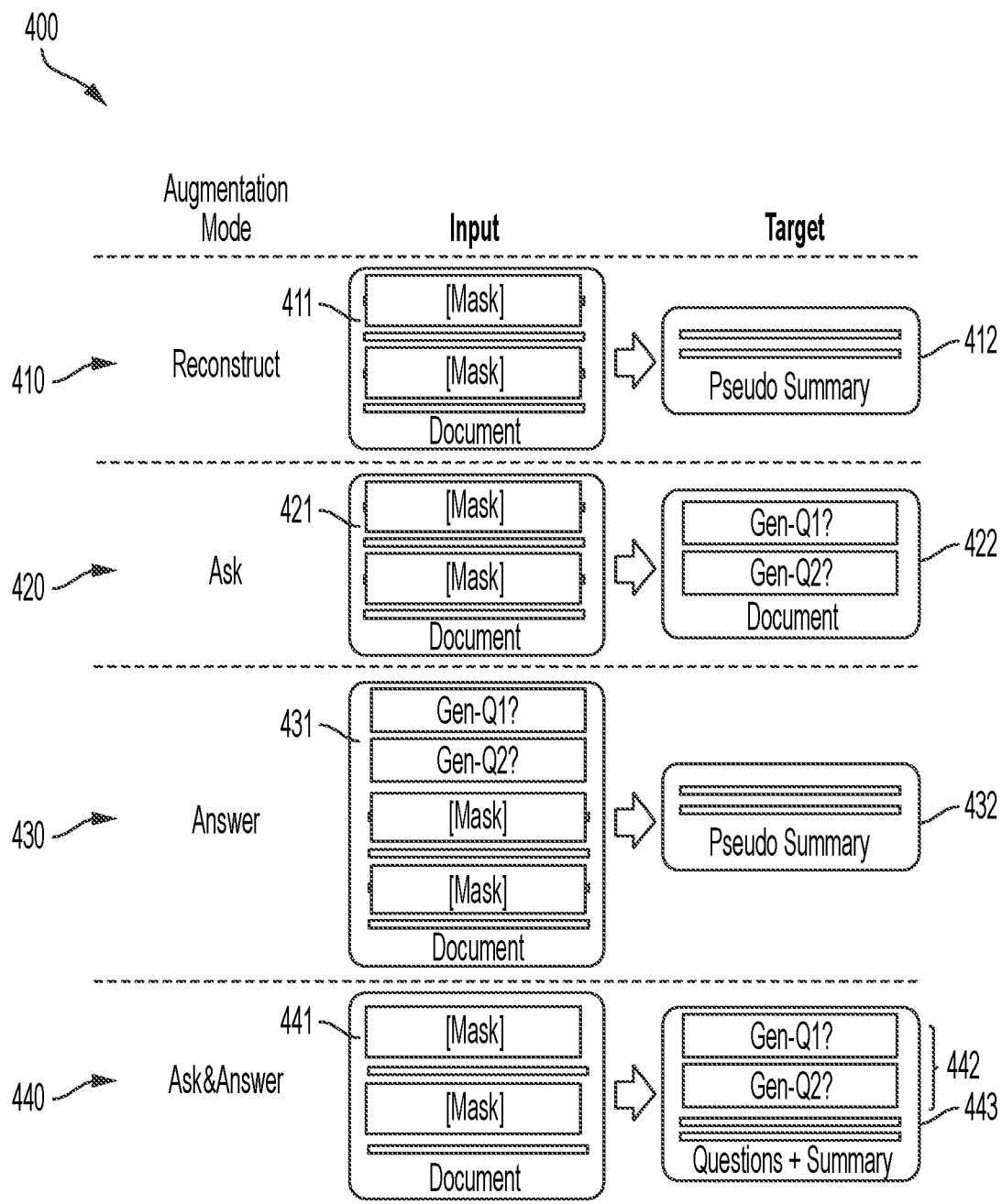
FIG. 4 is a simplified diagram illustrating example aspects of pretraining modes of the language model using generated questions and a pseudo summary of an input document, according to embodiments described herein.

In one embodiment, the neural network based question-driven summarization module 230 and one or more of its submodules 231-233 may be trained by updating the underlying parameters of the neural network based on the loss described in relation to FIG. 4. For example, the loss (such as a binary cross-entropy loss) is a metric that evaluates how far away a neural network model generates a predicted output value from its target output value (also referred to as the "ground-truth" value). The negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to the target output value.

In one embodiment, the question-driven summarization module 230 and its submodules 231-233 may be implemented by hardware, software and/or a combination thereof.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
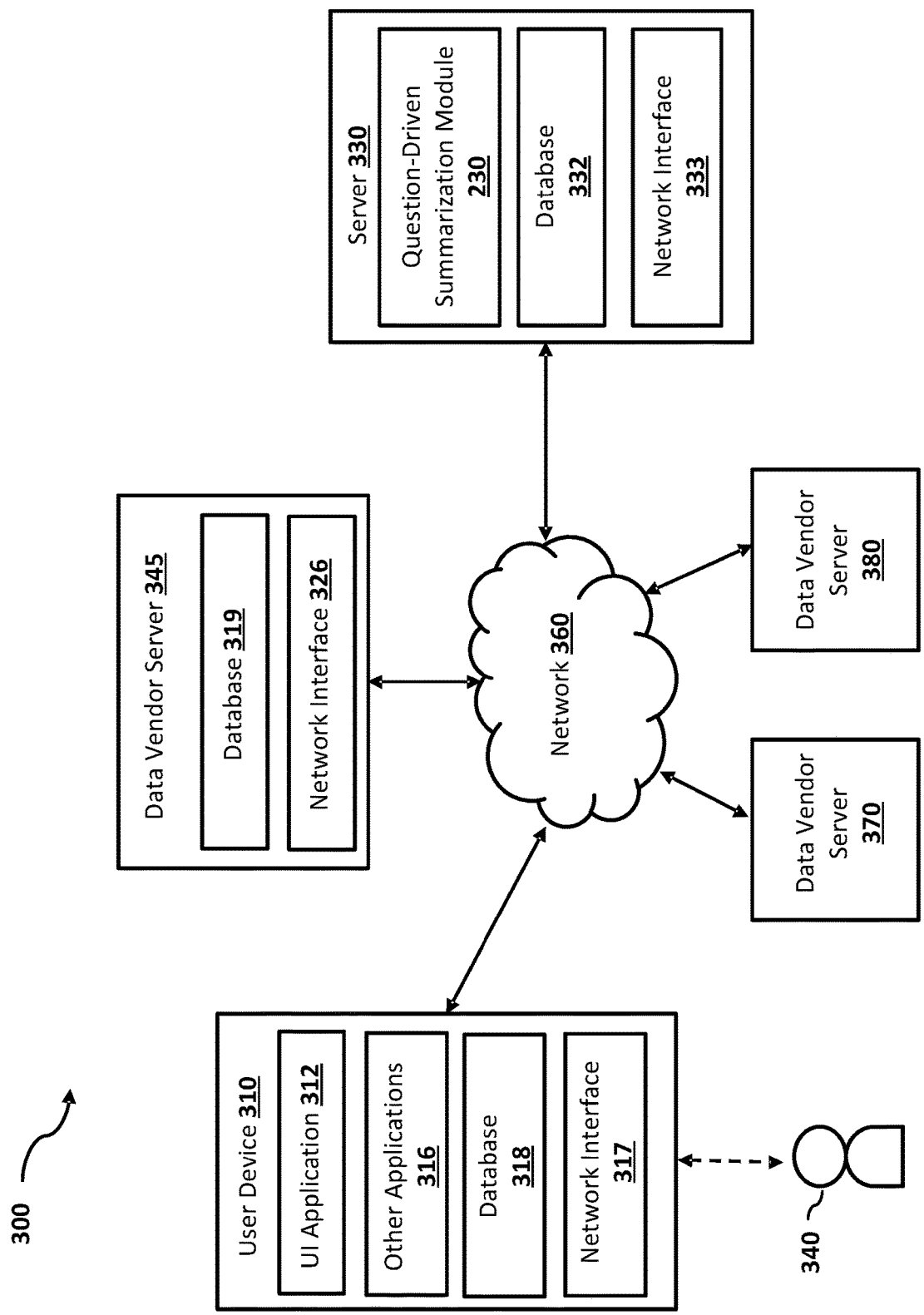
FIG. 3 is a simplified block diagram of a networked system suitable for implementing the question-driven summarization framework described in FIGS. 1B-2 and other embodiments described herein.

FIG. 3 is a simplified block diagram of a networked system suitable for implementing the question-driven summarization framework described in FIGS. 1-2 and other embodiments described herein. In one embodiment, block diagram 300 shows a system including the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating a summary from the server 330 and display the message via the UI application 312. In other embodiments, user device 310 may include additional or different modules having specialized hardware and/or software as required.

In one embodiment, the UI application 312 may comprise a browser application that comprises a reading interface for the user 340. The reading interface may receive a message from the server 330 to display a generate a summary of an article that the user device 310 is accessing.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a message from the server 330. Other applications 316 may include device interfaces and other display modules that may receive input and/or output information. For example, other applications 316 may contain software programs for asset management, executable by a processor, including a graphical user interface (GUI) configured to provide an interface to the user 340 to view the generated summary.

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including unlabeled document data to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the question-driven summarization module 230 and its submodules described in FIG. 2. In some implementations, the question-driven summarization module 230 may receive data from database 319 at the data vendor server 345 via the network 360 to generate a summary. The generated summary may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the question-driven summarization module 230. In one implementation, the database 332 may store previously generated summaries, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

In some embodiments, at least one of the data vendor servers 345, 370, 380 may correspond to a server associated with a news network, an online content web server, and/or the like. The user 340 may operate the user device 310 to access an article from the at least one data vendor server. A reading interface, e.g., as an extension of a web browser of UI application 312 on the user device 310, may send a notification to the server 330 that the user is accessing the article. The UI application 312 may further receive and forward a user query relating to the article to the server 330. The question-driven summarization module 230 may in turn generate a summary of the article which is based on the user query, and send the summary to the user device 310 for display via the UI application 312.

In some embodiments, the question-driven summarization module 230 may be installed on the user device 310, e.g., as an extension of the UI application 312. The client-based summarization module may receive parameter updates from the server 330 to generate a summary of articles displayed on the UI application 312.

FIG. 4 is a simplified diagram illustrating example aspects of pretraining modes of the language model using generated questions and a pseudo summary of an input document, according to embodiments described herein.

At the reconstruct mode 410, no questions are introduced. The masked document 411 is the input to the language model and the pseudo-summary 412 is the target text. Specifically, the language model generates predicted masked sentences as a predicted summary. The predicted summary is compared with the pseudo summary 412 to compute a cross-entropy loss.

At the ask mode 420, given the masked document 421 as input, the language model generates predicted questions 422 corresponding to the masked sentences in the masked documents 421. The predicted questions 422 are then compared with the ground-truth questions (e.g., generated by the question generation submodule 232 in FIG. 2) to compute a cross-entropy loss. With this mode, the language model is trained to predict which questions can be asked in a given context (e.g., the input document).

At the answer mode 430, questions are prepended to the masked input document to generate an input 431. The language model then generates a predicted summary in response to the input 431. The predicted summary is then compared with the pseudo-summary 432 (e.g., generated by concatenated selected sentences from the selection model 233 in FIG. 2) to compute a loss. This mode is similar to how queries are introduced to the language model during query-focused summarization and thus helps the language model learn to respond to user-provided queries. However, this mode may forgo content planning as each generated sentence corresponds to one of the questions prepended to the input. \

At the ask&answer mode 440, the language model first generates predicted questions about the document in response to an input of a masked document 441 and then, conditioning on both the masked document 441 and the generated questions, a predicted summary. The language model conditions on the generated questions in the decoder. The generated questions and the predicted summary may be then compared with the questions 442 (generated by the question generation model 232 in FIG. 2) and the pseudo summary 443 (e.g., generated by concatenated selected sentences from the selection model 233 in FIG. 2) to compute a loss. This mode can be seen as first generating a fine-grained plan for the pseudo-summary and then the pseudo-summary itself.

In one embodiment, special tokens <ask>, <answer>, and <ask&answer> may be prepended to the input document to the language model to specify the pretraining mode. The <qsep> token may be used to separate the generated questions 442 from the target pseudo-summary 443. For example, a decoder of the language model may determine, based on the special tokens <ask>, <answer>, and <ask&answer> that is prepended to the input, to generate the corresponding decoder output according to different modes described above.

Figure 5C:
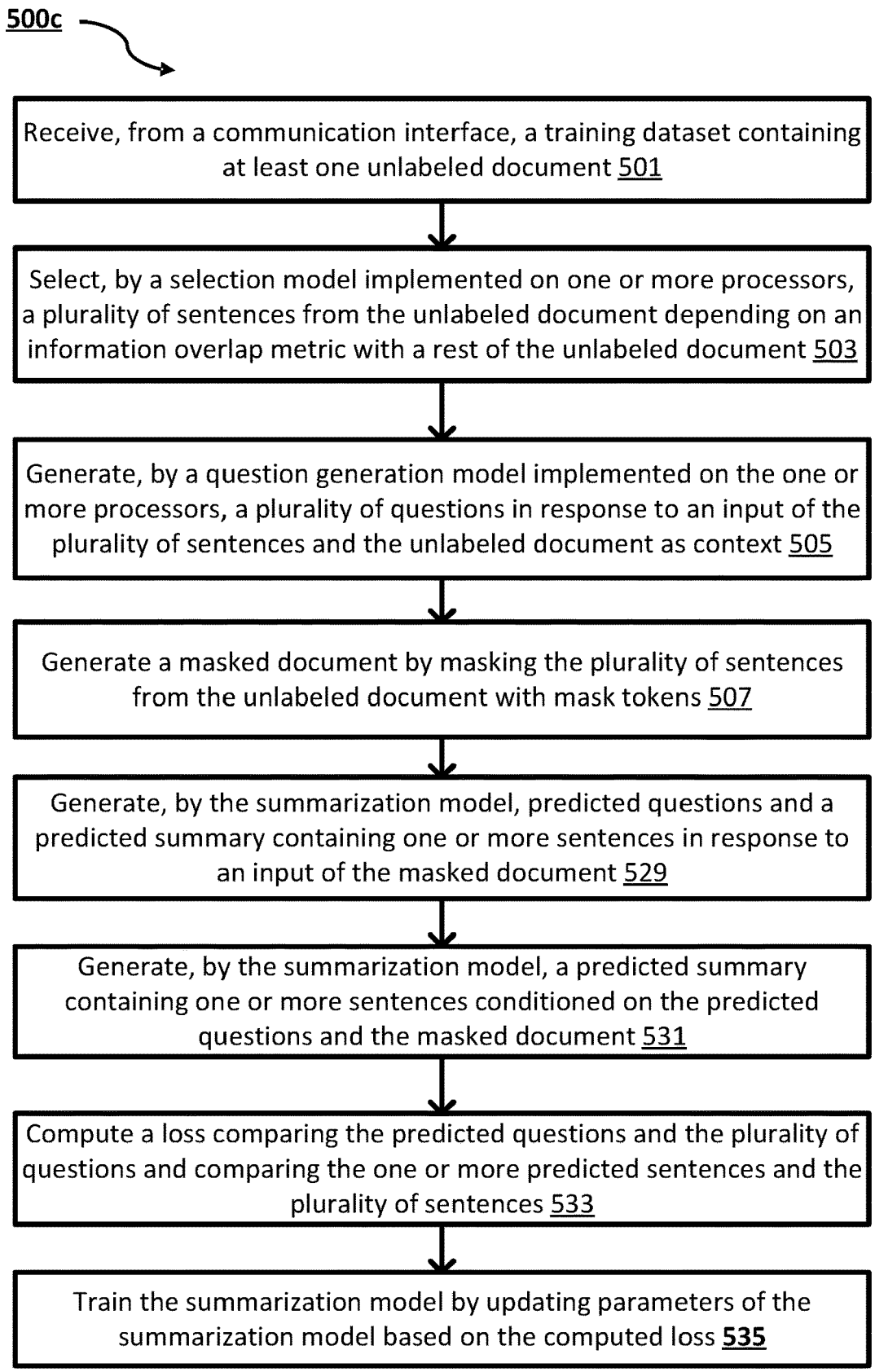

FIGS. 5A-5C are an example logic flow diagrams illustrating different modes of pretraining a question-driven summarization model based on the framework shown in FIG. 4, according to some embodiments described herein. One or more of the processes of methods 500a-c may be implemented, at least in part, in the form of executable code stored on non-transitory, tangible, machine-readable media that when run by one or more processors may cause the one or more processors to perform one or more of the processes. In some embodiments, methods 500a-c corresponds to the operation of the question-driven summarization module 230 (e.g., FIGS. 2-3) that performs is pretrained to generate a summary of an input document that addresses a user query.

As illustrated, the methods 500a-c include a number of enumerated steps, but aspects of the methods 500a-c may include additional steps before, after, and in between the enumerated steps. In some aspects, one or more of the enumerated steps may be omitted or performed in a different order.

Method 500a illustrates a logic flow of pretraining the summarization model under the ask mode 420 in FIG. 4. At step 501, a training dataset containing at least one unlabeled document mat be received, via a data interface (e.g., data interface 215 in FIG. 2, or network interface 333 in FIG. 3).

At step 503, a selection model (e.g., submodule 233 in FIG. 2) implemented on one or more processors may select a plurality of sentences from the unlabeled document depending on an information overlap metric with a rest of the unlabeled document. For example, the plurality of sentences are selected by a metric (e.g., self-ROUGE) that measure information overlap of each of the plurality of sentences with a rest of the input document.

At step 505, a question generation model (e.g., submodule 232 in FIG. 2) implemented on the one or more processors may generate a plurality of questions in response to an input of the plurality of sentences and the unlabeled document as context.

At step 507, a masked document is generated by masking the plurality of sentences from the unlabeled document with mask tokens.

At step 509, a summarization model (e.g., language model 231 in FIG. 2) implemented on the one or more processors may generate predicted questions in response to an input of the masked document.

At step 511, a first loss may be computed by comparing the predicted questions and the plurality of questions.

At step 513, the summarization model may be trained by updating parameters of the summarization model based on the computed first loss via backpropagation.

Method 500b illustrates a logic flow of pretraining the summarization model under the answer mode 430 in FIG. 4. Method 500b comprises similar steps 501-507 as method 500a. Starting at step 519, the summarization model may generate a predicted summary containing one or more sentences in response to an input of the masked document prepended with the plurality of questions.

At step 521, a second loss may be computed comparing the predicted one or more sentences and the plurality of sentences.

At step 523, the summarization model may be trained by updating parameters of the summarization model based on the computed second loss via backpropagation.

Method 500c illustrates a logic flow of pretraining the summarization model under the ask&answer mode 430 in FIG. 4. Method 500c comprises similar steps 501-507 as method 500a. Starting at step 529, the summarization model may generate predicted questions in response to an input of the masked document.

At step 531, the summarization model may generate a predicted summary containing one or more sentences conditioned on the predicted questions and the masked document.

At step 533, a third loss may be computed comparing the predicted questions and the plurality of questions and comparing the one or more predicted sentences and the plurality of sentences.

At step 535, the summarization model may be trained by updating parameters of the summarization model based on the computed second loss via backpropagation.

In one implementation, methods 500a-500c may be implemented alternately or sequentially. A dedicated token may be prepended to the masked document before inputting the masked document to the summarization model. The summarization model in turn determines a type of training output depending on the dedicated token. After any combination of methods 500a-500c, a testing document and a user query relating to a content of the testing document may be received. The trained summarization model may generate a question-driven summary of the testing document according to the user query.

FIGS. 6-14 provide example data experiment performance of the summarization model pretrained using embodiments described in FIGS. 1B-5C. Specifically, pretraining described in FIGS. 4-5C can be applied to any sequence-to-sequence language model irrespective of its specific architecture. For example, the language model (e.g., 231 in FIG. 2) may be BART-large (Lewis et al., BART: Denoising sequence-to-sequence pretraining for natural language generation, translation, and comprehension, in Proceedings of the 58th Annual Meeting of the Association for Computational Linguistics, pages 7871-7880, Online. Association for Computational Linguistics, 2020), as the starting point for pretraining adaptation.

In one embodiment, BART may be chosen over PEGASUS for its smaller size without performance compromises on summarization benchmarks and its more general-purpose pretraining objective. BART is also the underlying model in the SegEnc (Vig et al., Exploring neural models for query-focused summarization, in Findings of the Association for Computational Linguistics: NAACL 2022, pages 1455-1468, 2022) architecture, which achieved satisfactory performance on QMSum, outperforming models such as LongT5 (Guo et al., LongT5: Efficient text-to-text transformer for long sequences, in Findings of the Association for Computational Linguistics: NAACL 2022, pages 724-815, 2022). Instead of pretraining the language model from scratch, the effectiveness of the proposed objective can be established through pretraining adaptation, where a generic language model is further pretrained with the pretraining objectives in FIG. 4 before being finetuned on task-specific labeled data. 295

After pretraining adaptation, the resulting model is used to initialize the SegEnc architecture, which is then finetuned on labeled data from downstream tasks.

The data experiments may be carried out with three different corpora. OpenWebText2 is a web-scraped dataset that uses Reddit upvotes of outgoing links as a proxy for page quality. This dataset works well for summarization pretraining. Books3 is a collection of both fiction and nonfiction books. UnDial (He et al., Galaxy: A generative pre-trained model for task-oriented dialog with semi-supervised learning and explicit policy injection, in Proceedings of the AAAI Conference on Artificial Intelligence, 2022) is a dialogue corpus. As there are only two speakers in each dialogue in UnDial, a rule-based system is adopted to convert dialogues to third person. The pseudo-summary and related questions are then expressed in the third person while the input remains in the original dialogue format.

To determine whether pretraining improves model initialization for finetuning on controllable summarization, two downstream datasets are used for query-focused, long-document summarization: QMSum and SQUALITY. Long document datasets are used as a challenging and practical testbed for controllable summarization methods. QMSum is a benchmark for query-based, multi-domain meeting summarization (Zhong et al., QMSum: A new benchmark for query-based multi-domain meeting summarization, in Proceedings of the 2021 Conference of the North American Chapter of the Association for Computational Linguistics: Human Language Technologies, pages 5905-5921, 2021). The dataset consists of 1,808340 query-summary pairs over 232 meetings, including product, academic, and parliamentary meetings. SQUALITY is a dataset for query-based short stories summarization (Wang et al., Squality: Building a long-document summarization dataset the hard way. ArXiv preprint, abs/2205.11465, 2022). The dataset is composed of 625 examples over 100 stories with four long reference summaries per document-question pair.

Standard Rouge (Lin, ROUGE: A package for automatic evaluation of summaries. In Text Summarization Branches Out, pages 74-81, 2004) and BERTScore (Zhang et al., BERTscore: Evaluating text generation with BERT, In Proceedings of 8th International Conference on Learning Representations, 2020) metrics are adopted to compare model generations with reference summaries on downstream finetuning tasks. In SQUALITY, the same procedure as the dataset authors to incorporate multiple references by taking the maximum score over the reference summaries. A human evaluation study is also conducted to ensure the variations between models are meaningful to users.

Figure 6:
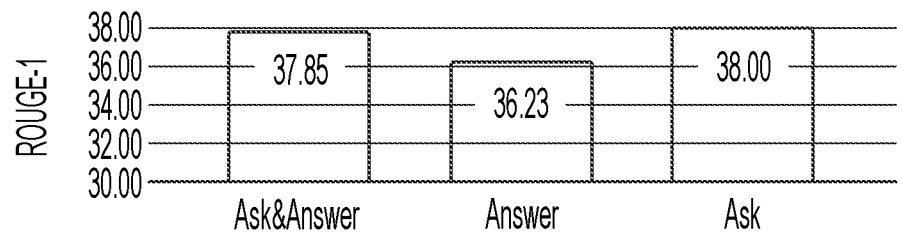

In FIG. 6, performance of the three approaches are compared for incorporating generated questions in the pretraining objective. The Ask and Ask&Answer modes perform similarly while Answer lags behind. This is in line with our hypothesis that learning which questions are relevant in a given context is a useful training signal for the model. The Ask&Answer mode also grounds the pseudo-summary generation in a sequence of finegrained questions. Therefore, it is chosen to be used in the pretraining.

Figure 7:
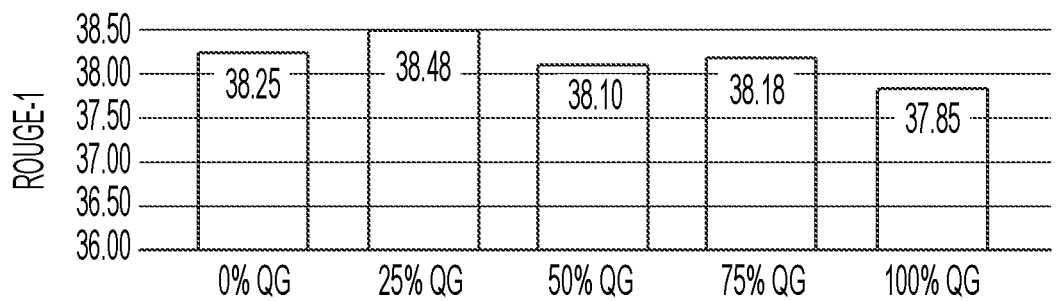

Incorporating questions with the Ask&Answer mode in each pretraining example could bias the model to always start by generating questions. Combining the Reconstruct mode with the Ask&Answer mode could alleviate this bias. In FIG. 7, it is observed that introducing questions in 25% of pretraining examples leads to the best performance and use this proportion when scaling the pretraining adaptation.

Figures 8A, 8B:
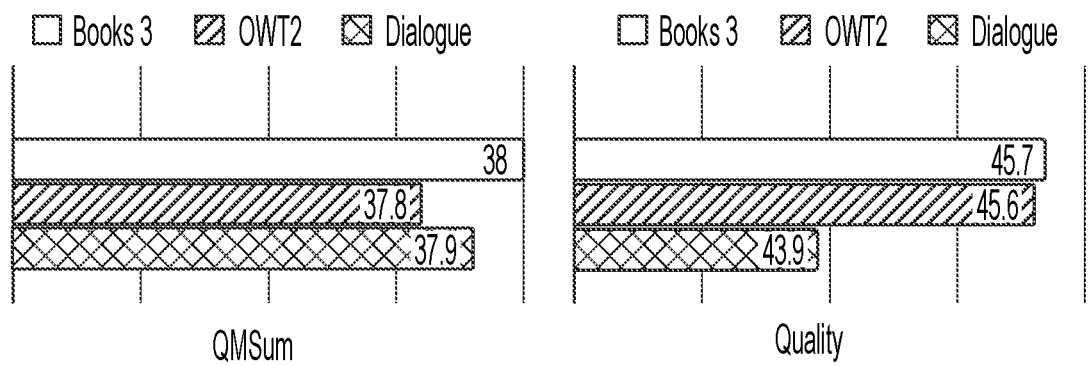
Figure 10:
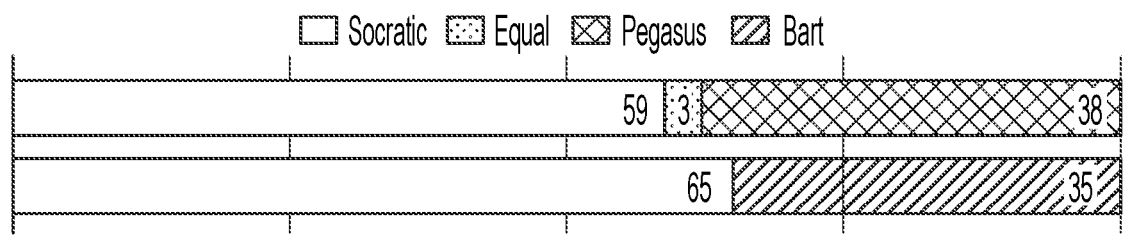

In FIGS. 8A-8B, it shows the choice of pretraining corpus has a small but consistent effect on the performance of the pretrained model on downstream tasks. The Books3 corpus performs best both on QMSum and SQUALITY. The dialogue corpus offers a slight advantage over OpenWebText2 on QMSum, a dialogue summarization task, while the opposite is true for SQUALITY. As a result, the full Books3 corpus, consisting of 30M training instances, is used in further experiments.

The pretraining adaptation is scaled based on the findings of the previous ablation and evaluate its downstream effects on query-focused summarization. Unless specified, the results are averaged over five randomly initialized finetuning runs on the downstream tasks. As shown in the Table of FIG. 9, the effect of pretraining is compared to other pretraining strategies on QMSum and SQUALITY. An improvement of +1.01 and +0.53 Rouge-1, respectively, surpasses even the use of additional supervision from the related dataset WikiSum in Vig et al. (2022) and achieving the most superior results. These improvements are validated by a human study reported in FIG. 10 and showing that SegEnc performs better than the baselines in 65% of instances.

The main baseline for the proposed pretraining framework is the PEGASUS style GSG pretraining. A pretraining adaptation of BART-large is performed with the GSG objective on the full Books3 corpus. In FIG. 9, it is observed that GSG pretraining on the full Books3 corpus improves by +0.24 Rouge-1 over the BART SegEnc model. However, with the pretraining objectives, 1M examples from Books3 (⅓₀ of the full corpus) are sufficient to surpass GSG pretraining, with a +0.41 Rouge-1 improvement over BART SegEnc. This indicates that GSG pretraining, tailored to generic summarization, is only marginally helpful in tasks where summaries have to answer user-provided queries. In addition, increasing the corpus for pretraining to the entire Books3 corpus further improves the performance by +0.60 Rouge-1 on QMSum, showing that the benefits of the pretraining objective do not saturate early and that the model continues to improve with additional pretraining.

The summarization model is also compared to BART-LS, an orthogonal approach that tailors BART's architecture, pretraining corpus, and objective to long documents. While the proposed pretraining approaches are complementary, BART-LS is outperformed on QMSum by +1.64 Rouge-2. This confirms the hypothesis that grounding generations in control queries in pretraining is beneficial in controllable summarization, even more so than better long document modeling.

Some existing work shows that language models can be successfully adapted to the task domain by continuing to pretrain them in the new domain. This raises the question of whether improvements due to pretraining are simply due to a better affinity of the pretraining corpus to the task domain. To answer this question, continued pretraining is performed on a 1M subset of the Books3 corpus and next finetune the model on QMSum. Table of FIG. 9 shows that continued pretraining slightly hurts Rouge-1 performance. In comparison, performing the pretraining on the same corpus improves performance by +0.41 Rouge-1. This observation rules out that improvements achieved through pretraining are simply due to improved domain adaptation Some existing work shows that transferring information from related tasks is another approach to adapt generic models to specific tasks. Table of FIG. 9 shows that pretraining outperforms even the best pre-finetuned BART SegEnc model, which uses additional supervision from the WikiSum dataset. This transfer dataset was selected from a wide range of relevant summarization datasets tested by Vig et al. (2022). Crucially, transfer learning, like prefinetuning, is orthogonal to our line of work which operates on the pretraining side. The proposed pretraining can therefore be used in combination with pre-finetuning to further boost performance.

Figure 11:
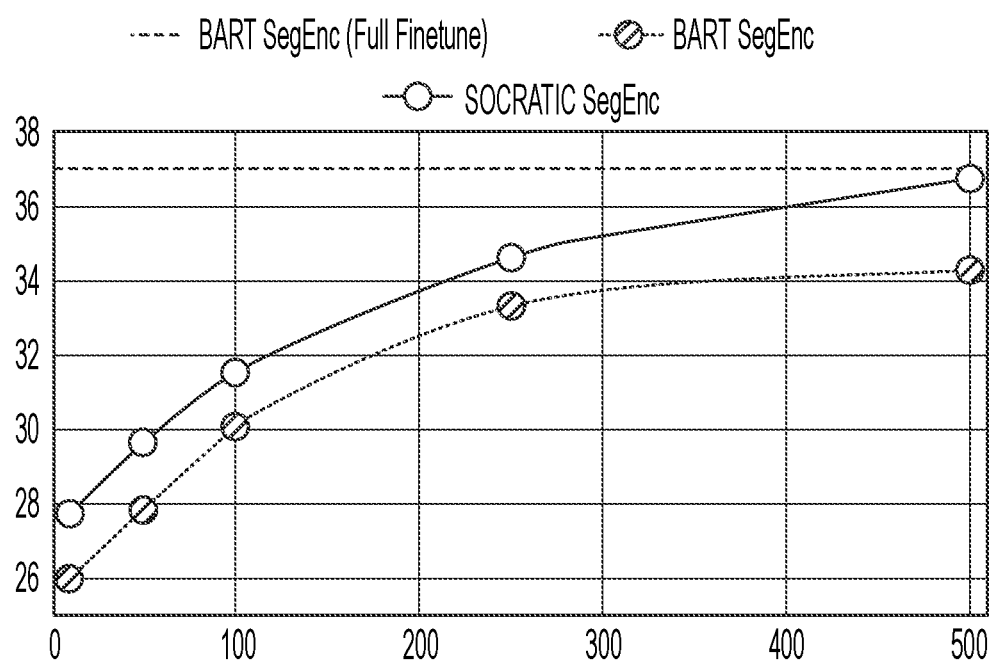

To show that the proposed pretraining alleviates the need for labeled downstream task data, the few-shot learning performance of the proposed pretraining and BART SegEnc models. One finetuning run is provided for each model on each subset of the task data. In FIG. 11, it is shown that with half the QMSum examples, SegEnc achieves the same performance as finetuning BART SegEnc on all of QMSum. Therefore, bringing the proposed pretraining closer to the downstream task of query-focused summarization lets the models learn from fewer downstream task examples.

The queries found in QMSum and SQUALITY are only one format to encode user intent. As seen in FIG. 21, these strategies offer a more finegrained level of control over the summaries as they operate at the sentence level. Reference control sequences are not available for QMSum and SQUALITY so they are generated automatically from reference summaries.

In one embodiment, three different planning strategies are experimented. The first is content questions. For each sentence in the reference summary, a question is generated using the MixQG system while giving the full summary as context. These are similar to the questions that used in the pretraining. The sentence-level questions are then concatenated into a single plan for the summary.

The second is QA blueprint. First, all noun phrase answers are extracted from the reference. Then, a QG system generates questions answered by each noun phrase. The QA pairs are then filtered using round-trip consistency, rheme, and coverage criteria. The final plan consists of the concatenation of the remaining QA pairs. 545

The third is Keywords. Keywords are extracted from each sentence of the reference summary. The noun-phrase answers are taken from the QA blueprint as keywords and concatenate them with sentence separators into a plan. In FIG. 13, evaluation metrics are reported for both the model-generated summaries and plans. It is shown that with all three control strategies, pretraining provides a consistent improvement over the vanilla BART model and the PEGASUS pretraining on both the generated fine-grained plan and summary. On the planning side, there is a small but consistent improvement, up to +0.9 Rouge-1 with keyword chain control, indicating that the model has improved planning abilities.

On the summarization side, a more significant improvement with up to +1.9 Rouge-1 with blueprint QA control. This may be attributed to a combination of improved planning and execution ability of the model from pretraining.

With respect to control strategy performance, it is observed that content questions obtain the highest Rouge scores (42.4 Rouge-1), outperforming keyword chains with only 25.0 Rouge-1. Despite the keyword plan having low overlap with the reference, it results in good summarization performance, so it is unclear whether the model using keyword chains learns the right correspondence between plan and summary. Moreover, the generated keyword chain would need heavier editing to obtain the reference plan compared to the content question plan (0.88 Level distance compared to 0.77), making them less useful in practice.

Figures 14, 15:
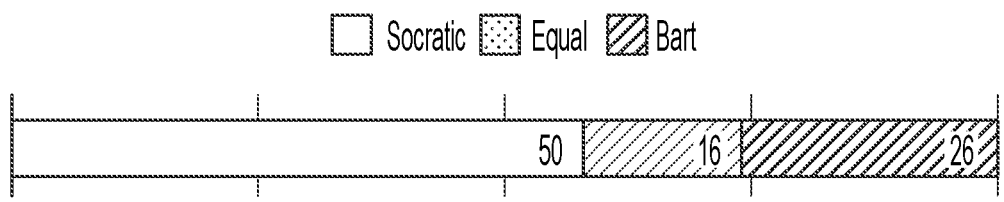

In some situations, an oracle may be employed. Users can tailor generated summaries with an intervention limited to editing the generated plans. However, this requires strong adherence of generations to the fine-grained plans, which is tested here with oracle plans. Instead of generating both plan and summary, the system is given the oracle plans automatically extracted from the reference summaries. In FIG. 14, it is observed that a large improvement of +3.1 Rouge-1 over the BART SegEnc baseline. Human annotators confirm that SegEnc follows oracle finegrained plans better or similarly to the baseline in 74% of instances, shown in FIG. 15. This confirms the assumption that the proposed pretraining helps ground the generations to user-provided queries. These gains may be attributed to using the Ask&Answer mode, which introduces structure in the pretraining data by using as target text a question plan followed by its pseudo-summary answer. This structure in pretraining is what helps the model adhere to the planning step more effectively regardless of the control strategy.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of training a pretrained language model for question-driven summarization, the method comprising:
receiving, via a data interface, a training dataset containing at least one unlabeled document;
selecting, by a selection model implemented on one or more processors, a plurality of sentences from the unlabeled document depending on an information overlap metric with a rest of the unlabeled document;
generating, by a question generation model connected to the selection model implemented on the one or more processors, a plurality of questions in response to an input of the plurality of sentences and the unlabeled document as context;
generating a masked document by masking the plurality of sentences from the unlabeled document with mask tokens;
generating, by the pretrained model as a summarization model implemented on the one or more processors, predicted questions in response to an input of the masked document;
training the summarization model based on a first loss obtained by a comparison between the predicted questions and the plurality of questions;
generating, by the summarization model, a predicted summary containing one or more sentences in response to an input of the masked document prepended with the plurality of questions;
training again the summarization model based on a second loss obtained by a comparison between the predicted one or more sentences and the plurality of sentences;
in response to receiving a user query relating to the article from a user device, generating, by the trained summarization model, a query-driven summary of the article according to the user query; and
causing the query-driven summary to be displayed at a reading interface of a web browser at the user device at a time when the user is accessing the article through the reading interface.

2. The method of claim 1, wherein the plurality of sentences are selected by a metric that measure information overlap of each of the plurality of sentences with a rest of the input document.

3. The method of claim 1, further comprising:
generating, by the summarization model implemented on the one or more processors, predicted questions in response to an input of the masked document;
computing a third loss comparing the predicted questions and the plurality of questions and comparing the one or more predicted sentences and the plurality of sentences; and
training the summarization model by updating parameters of the summarization model based on the computed third loss via backpropagation.

4. The method of claim 1, further comprising:
generating, by the summarization model, reconstructed sentences in response to an input of the masked document;
computing a third loss comparing the reconstructed sentences and the plurality of sentences; and
training the summarization model by updating parameters of the summarization model based on the computed third loss via backpropagation.

5. The method of claim 1, further comprising:
prepending a dedicated token to the masked document before inputting the masked document to the summarization model; and
determining a type of training output depending on the dedicated token.

6. The method of claim 1, further comprising:
receiving a testing document and a user query relating to a content of the testing document; and
generating, by the trained summarization model, a question-driven summary of the testing document according to the user query.

7. A system of training a pretrained language model for question-driven summarization, the system comprising:
a communication interface that receives a training dataset containing at least one unlabeled document;
a memory storing a selection model, a question generation model, a summarization model and a plurality of processor-executable instructions; and one or more processors executing the plurality of processor-executable instructions to perform operations comprising:
  selecting, by the selection model, a plurality of sentences from the unlabeled document depending on an information overlap metric with a rest of the unlabeled document;
  generating, by the question generation model connected to the selection model implemented on the one or more processors, a plurality of questions in response to an input of the plurality of sentences and the unlabeled document as context;
  generating a masked document by masking the plurality of sentences from the unlabeled document with mask tokens;
  generating, by the pretrained model as the summarization model implemented on the one or more processors, predicted questions in response to an input of the masked document;
  training the summarization model based on a first loss obtained by a comparison between the predicted questions and the plurality of questions;
  generating, by the summarization model, a predicted summary containing one or more sentences in response to an input of the masked document prepended with the plurality of questions;
  training again the summarization model based on a second loss obtained by a comparison between the predicted one or more sentences and the plurality of sentences;
  in response to receiving a user query relating to the article from a user device, generating, by the trained summarization model, a query-driven summary of the article according to the user query; and
  causing the query-driven summary to be displayed at a reading interface of a web browser at the user device at a time when the user is accessing the article through the reading interface.

8. The system of claim 7, wherein the plurality of sentences are selected by a metric that measure information overlap of each of the plurality of sentences with a rest of the input document.

9. The system of claim 7, wherein the operations further comprise:
  generating, by the summarization model implemented on the one or more processors, predicted questions in response to an input of the masked document;
  computing a third loss comparing the predicted questions and the plurality of questions; and
  training the summarization model by updating parameters of the summarization model based on the computed third loss via backpropagation.

10. The system of claim 7, wherein the operations further comprise:
  computing a fourth loss comparing the predicted questions and the plurality of questions and comparing the one or more predicted sentences and the plurality of sentences; and
  training the summarization model by updating parameters of the summarization model based on the computed fourth loss via backpropagation.

11. The system of claim 7, wherein the operations further comprise:
  generating, by the summarization model, reconstructed sentences in response to an input of the masked document;
  computing a third loss comparing the reconstructed sentences and the plurality of sentences; and
  training the summarization model by updating parameters of the summarization model based on the computed third loss via backpropagation.

12. The system of claim 7, wherein the operations further comprise:
  prepending a dedicated token to the masked document before inputting the masked document to the summarization model; and
  determining a type of training output depending on the dedicated token.

13. The system of claim 7, wherein the operations further comprise:
  receiving a testing document and a user query relating to a content of the testing document; and
  generating, by the trained summarization model, a question-driven summary of the testing document according to the user query.

14. A non-transitory processor-readable storage medium storing a plurality of processor-executable instructions for training a pretrained language model for question-driven summarization, the instructions being executed by one or more processors to perform operations comprising:
  receiving, via a data interface, a training dataset containing at least one unlabeled document;
  selecting, by a selection model implemented on one or more processors, a plurality of sentences from the unlabeled document depending on an information overlap metric with a rest of the unlabeled document;
  generating, by a question generation model connected to the selection model implemented on the one or more processors, a plurality of questions in response to an input of the plurality of sentences and the unlabeled document as context;
  generating a masked document by masking the plurality of sentences from the unlabeled document with mask tokens;
  generating, by the pretrained model as a summarization model implemented on the one or more processors, predicted questions in response to an input of the masked document;
  training the summarization model based on a first loss obtained by a comparison between the predicted questions and the plurality of questions;
  generating, by the summarization model, a predicted summary containing one or more sentences in response to an input of the masked document prepended with the plurality of questions;
  training again the summarization model based on a second loss obtained by a comparison between the predicted one or more sentences and the plurality of sentences;
  in response to receiving a user query relating to the article from a user device, generating, by the trained summarization model, a query-driven summary of the article according to the user query; and
  causing the query-driven summary to be displayed at a reading interface of a web browser at the user device at a time when the user is accessing the article through the reading interface.

15. The non-transitory processor-readable storage medium of claim 14, wherein the plurality of sentences are selected by a metric that measure information overlap of each of the plurality of sentences with a rest of the input document.

16. The non-transitory processor-readable storage medium of claim 14, wherein the operations further comprise:
  generating, by the summarization model implemented on the one or more processors, predicted questions in response to an input of the masked document;
  computing a third loss comparing the predicted questions and the plurality of questions; and
  training the summarization model by updating parameters of the summarization model based on the computed third loss via backpropagation.

17. The non-transitory processor-readable storage medium of claim 15, wherein the operations further comprise:
  prepending a dedicated token to the masked document before inputting the masked document to the summarization model; and
  determining a type of training output depending on the dedicated token.

18. The non-transitory processor-readable storage medium of claim 14, wherein the operations further comprise:
  receiving a testing document and a user query relating to a content of the testing document; and
  generating, by the trained summarization model, a question-driven summary of the testing document according to the user query.

* * * * *